United States Patent
Kertz et al.

(10) Patent No.: US 7,717,205 B2
(45) Date of Patent: May 18, 2010

(54) ENGINE HOOD ASSEMBLY ENCLOSURE WITH EXHAUST AFTERTREATMENT DEVICE INTEGRATED THEREIN, AND MACHINE USING SAME

(75) Inventors: Tony G. Kertz, Washington, IL (US); Christopher M. Brian, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 276 days.

(21) Appl. No.: 11/605,054

(22) Filed: Nov. 28, 2006

(65) Prior Publication Data

US 2008/0121451 A1     May 29, 2008

(51) Int. Cl.
*B60K 11/00*     (2006.01)

(52) U.S. Cl. ............ 180/68.3; 180/68.1; 180/69.2

(58) Field of Classification Search ............ 180/68.3, 180/68.1, 89.18, 309, 69.2, 69.24, 69.3; 123/198 R, 123/559.2, 41.49; 60/322, 274, 277, 286, 60/282

See application file for complete search history.

(56) References Cited

U.S. PATENT DOCUMENTS

| | | | | |
|---|---|---|---|---|
| 3,358,787 A | * | 12/1967 | Bangasser et al. | 180/69.2 |
| 3,625,189 A | * | 12/1971 | Myers et al. | 123/2 |
| 3,960,238 A | * | 6/1976 | McClure et al. | 181/204 |
| 4,086,976 A | * | 5/1978 | Holm et al. | 180/68.1 |
| 4,137,983 A | * | 2/1979 | Gray | 180/69.24 |
| 4,308,930 A | | 1/1982 | Iida et al. | |
| 4,341,277 A | * | 7/1982 | Adamson et al. | 180/68.1 |
| 4,719,752 A | * | 1/1988 | Hall | 60/322 |
| 5,586,433 A | * | 12/1996 | Boegner et al. | 60/274 |
| 5,832,726 A | * | 11/1998 | Rees et al. | 60/322 |
| 6,022,254 A | * | 2/2000 | Neisen | 181/243 |
| 6,164,062 A | * | 12/2000 | Blichmann | 180/309 |
| 6,173,567 B1 | * | 1/2001 | Poola et al. | 60/274 |
| 6,269,633 B1 | * | 8/2001 | van Nieuwstadt et al. | 60/277 |
| 6,293,096 B1 | * | 9/2001 | Khair et al. | 60/286 |
| 6,354,078 B1 | * | 3/2002 | Karlsson et al. | 60/274 |
| 6,729,127 B2 | | 5/2004 | Woerner et al. | |
| 6,874,589 B1 | * | 4/2005 | Williams | 180/68.3 |
| 6,983,728 B1 | * | 1/2006 | Banks et al. | 123/198 R |
| 6,990,804 B2 | | 1/2006 | Jacob et al. | |

(Continued)

OTHER PUBLICATIONS https://sis.cat.com/sisweb/sisweb/techdoc/content.jsp; Special Instruction D10T Field Conversion from RATAAC to ATAAC{1063, 1063}; Feb. 16, 2006.

https://sis.cat.com/sisweb/sisweb/techdoc/content.jsp; Disassembly and Assembly D10T Track-Type Tractor Engine Supplement; RENR7544-04; Aug. 1, 2006.

(Continued)

*Primary Examiner*—Hau V Phan
(74) *Attorney, Agent, or Firm*—Liell & McNeil

(57) ABSTRACT

A hood assembly for a machine includes an enclosure within which at least one exhaust aftertreatment device is mounted. The engine hood assembly may be preassembled so that the exhaust aftertreatment system is integrated into the enclosure. This may allow the hood assembly to be assembled to the machine and the exhaust aftertreatment system mated to an exhaust pipe from the engine as a unit while the machine is being built on an assembly line. The engine hood assembly may include ventilation openings to assist in heat rejection from the engine compartment and from the exhaust aftertreatment devices. The hood assembly of the present disclosure finds particular application in assisting large track type tractors in meeting ever more stringent exhaust emission requirements without extensive and expensive redesign alternatives.

12 Claims, 3 Drawing Sheets

U.S. PATENT DOCUMENTS 7,093,428 B2 * 8/2006 LaBarge et al. ............... 60/286
7,127,884 B2    10/2006 Worner et al.
2007/0240404 A1 * 10/2007 Pekrul et al. ................. 60/282

OTHER PUBLICATIONS

U.S. Appl. No. 12/320,426 entitled "Exhaust System Thermal Enclosure" by Jack A. Merchant et al, filed Jan. 26, 2009.

* cited by examiner

ENGINE HOOD ASSEMBLY ENCLOSURE WITH EXHAUST AFTERTREATMENT DEVICE INTEGRATED THEREIN, AND MACHINE USING SAME

TECHNICAL FIELD

The present disclosure relates generally to the incorporation of exhaust aftertreatment devices into machines, and more particularly to an engine hood assembly enclosure that houses at least one exhaust aftertreatment device.

BACKGROUND

Regulations governing exhaust emissions from internal combustion engines are becoming increasingly more stringent in many jurisdictions. Among the regulated exhaust emissions are NOx, particulate matter and hydrocarbons. Many machines utilize internal combustion engines as a means of powering propulsion systems, work implements and the like. Among these machines are track-type tractors, wheel loaders, compactors, excavators, graders, forestry machines, scrapers, and many others. While great strides have been made in reducing undesirable engine exhaust emissions at the point of combustion using a variety of innovative techniques, it may still be necessary to treat engine exhaust before venting via a tail pipe to the atmosphere, in order to meet regulation requirements. Most machines have evolved to design shapes that best facilitate their specific purpose. As a consequence, limited spatial envelopes are available for the incorporation of exhaust aftertreatment devices, without requiring substantial and costly redesign of the machine. These spatial envelope constraints may be further acute by other requirements, such as maintaining heat rejection levels from an engine or other components at satisfactory levels.

In one specific example, track-type tractors include a diesel engine mounted on a frame within an engine compartment that is covered by an engine hood assembly. In the case of the Caterpillar D10 track-type tractor, a portion of the muffler assembly for the exhaust may be incorporated into the engine hood. While this strategy better integrates noise suppression mufflers into the overall machine design, it fails to account for a more current need to treat exhaust for more than noise emissions. In particular, the current D10 tractor has limited space available for incorporation of exhaust aftertreatment devices while maintaining heat rejection standards for the engine and maintaining other requirements, such as operator visibility.

The present disclosure is directed toward one or more of the problems set forth above.

SUMMARY OF THE INVENTION

In one aspect, a machine includes an engine based propulsion system attached to a frame. An engine hood is positioned over the engine and includes an enclosure. At least one exhaust aftertreatment device is mounted in the enclosure and fluidly connected to an exhaust pipe from the engine through an opening in the bottom of the enclosure. An exhaust stack is fluidly connected to the aftertreatment device and extends through the enclosure.

In another aspect, an engine hood assembly for a machine includes an enclosure with a plurality of ventilation openings into its interior. At least one aftertreatment device is mounted in the interior of the enclosure. An engine exhaust passage extends through a bottom of the enclosure and is connected to at least one aftertreatment device. An exhaust stack extends through a top of the enclosure and is fluidly connected to the at least one aftertreatment device.

In still another aspect, a method of assembling a machine includes lowering a hood assembly enclosure onto the machine. An exhaust aftertreatment system of the hood assembly enclosure is fluidly connected to an exhaust pipe from the engine of the machine. The hood assembly is connected to a frame of the machine.

DETAILED DESCRIPTION

Figure 1:
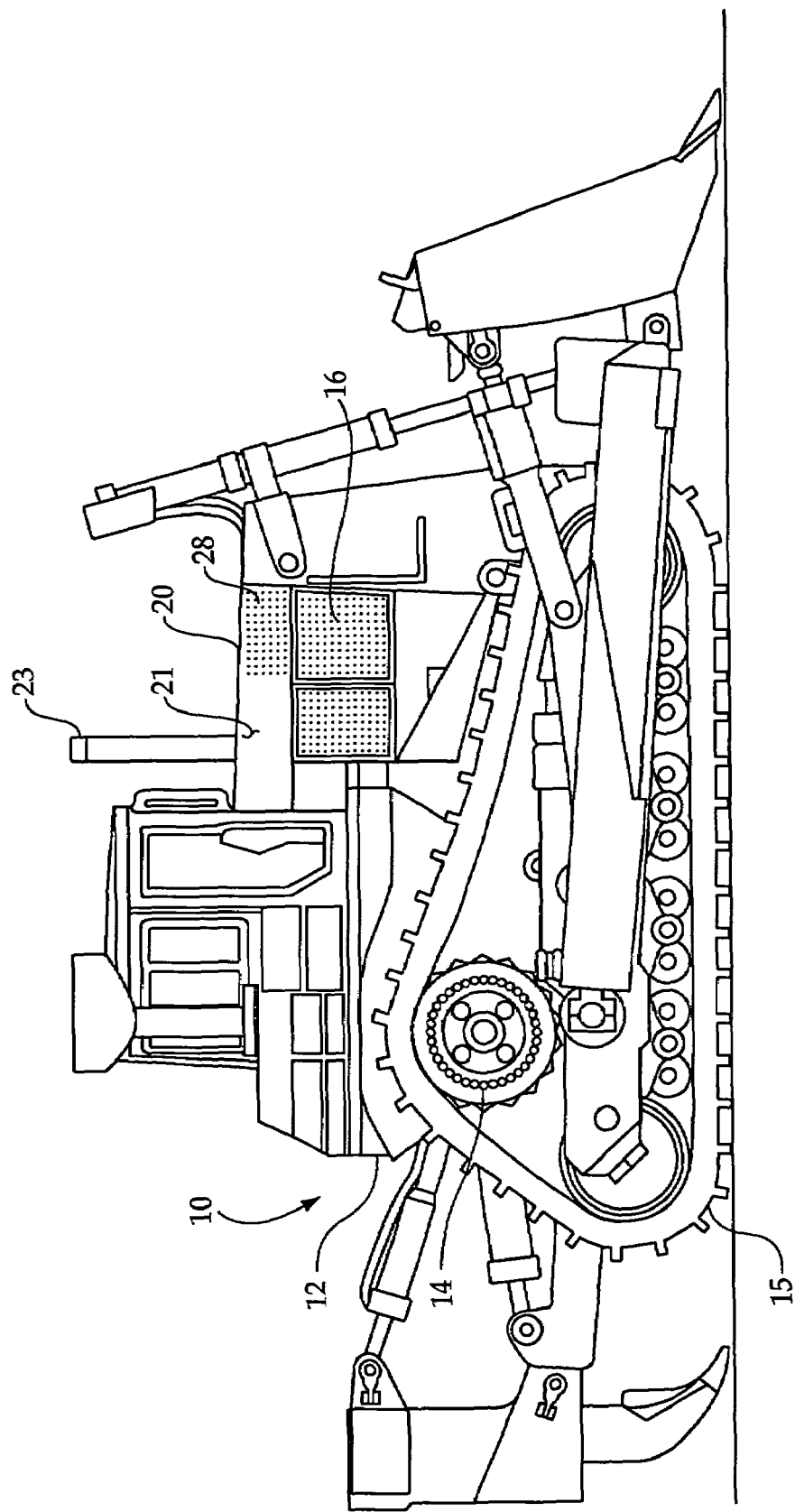
FIG. 1 is a side schematic elevational view of a machine according to one embodiment of the present disclosure.

Referring to FIG. 1, a machine 10 includes a frame 12 upon which a propulsion system 14 is mounted. In this specific example, machine 10 is a relatively large track-type tractor, and the propulsion system 14 includes a diesel engine 16 that provides power to propel machine 10 via track 15 in a conventional manner. The engine 16 is positioned in an engine compartment that is covered by an engine hood assembly 20. Exhaust from engine 16 is vented to atmosphere via an exhaust stack 23 that protrudes through the top surface of hood assembly 20. Hood assembly 20 includes an enclosure 21 that defines a plurality of ventilation openings 28, which may be distributed in a rectangular array of rows and columns.

Figure 3:
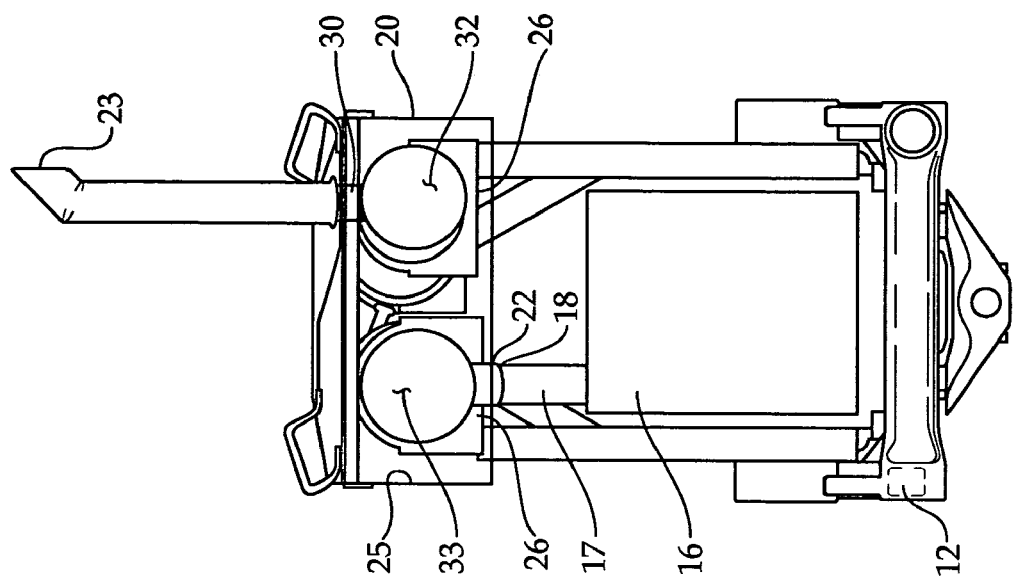
FIG. 3 is an end schematic view of the assembly shown in FIG. 2.
Figure 2:
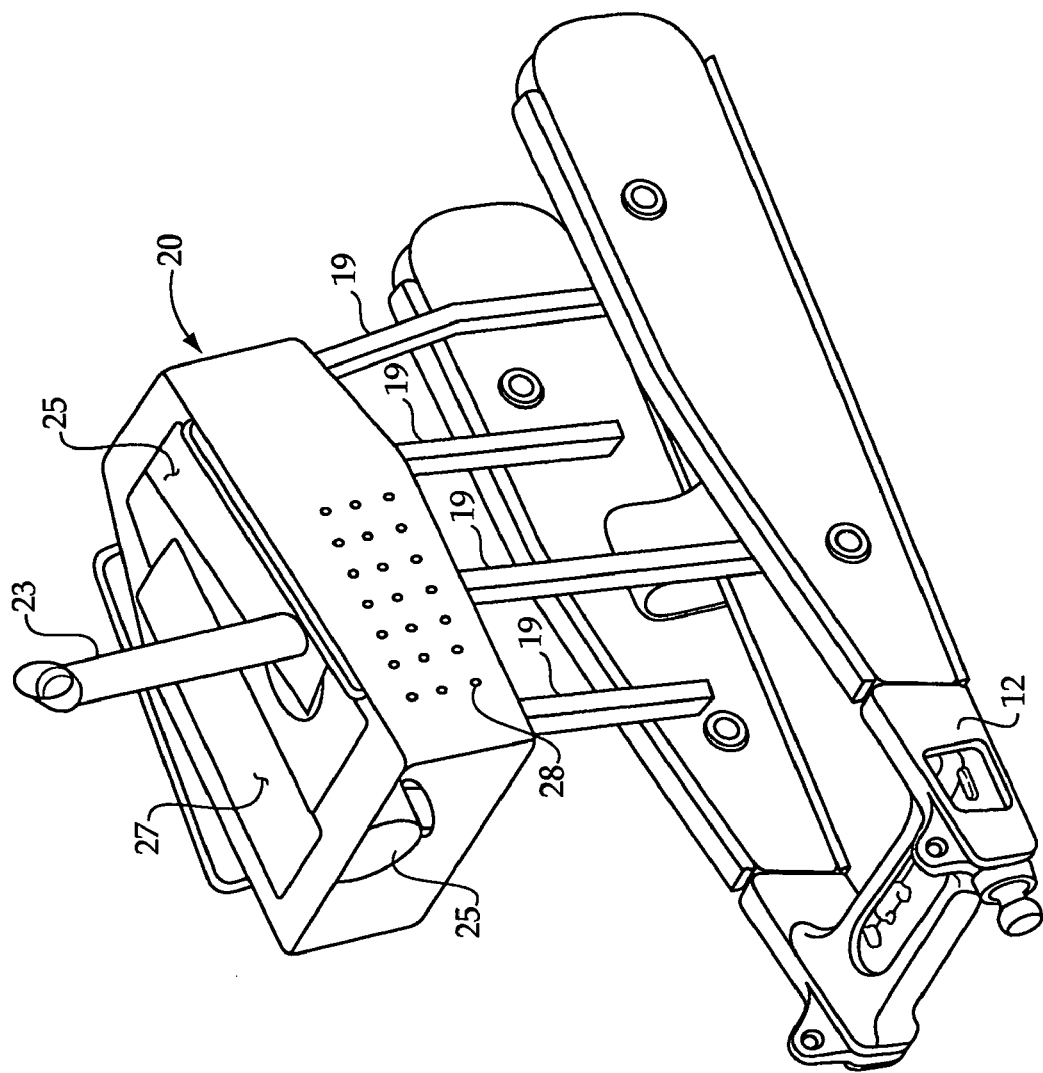
FIG. 2 is a perspective view of an engine hood assembly and frame for the machine of FIG. 1.
Figure 4:
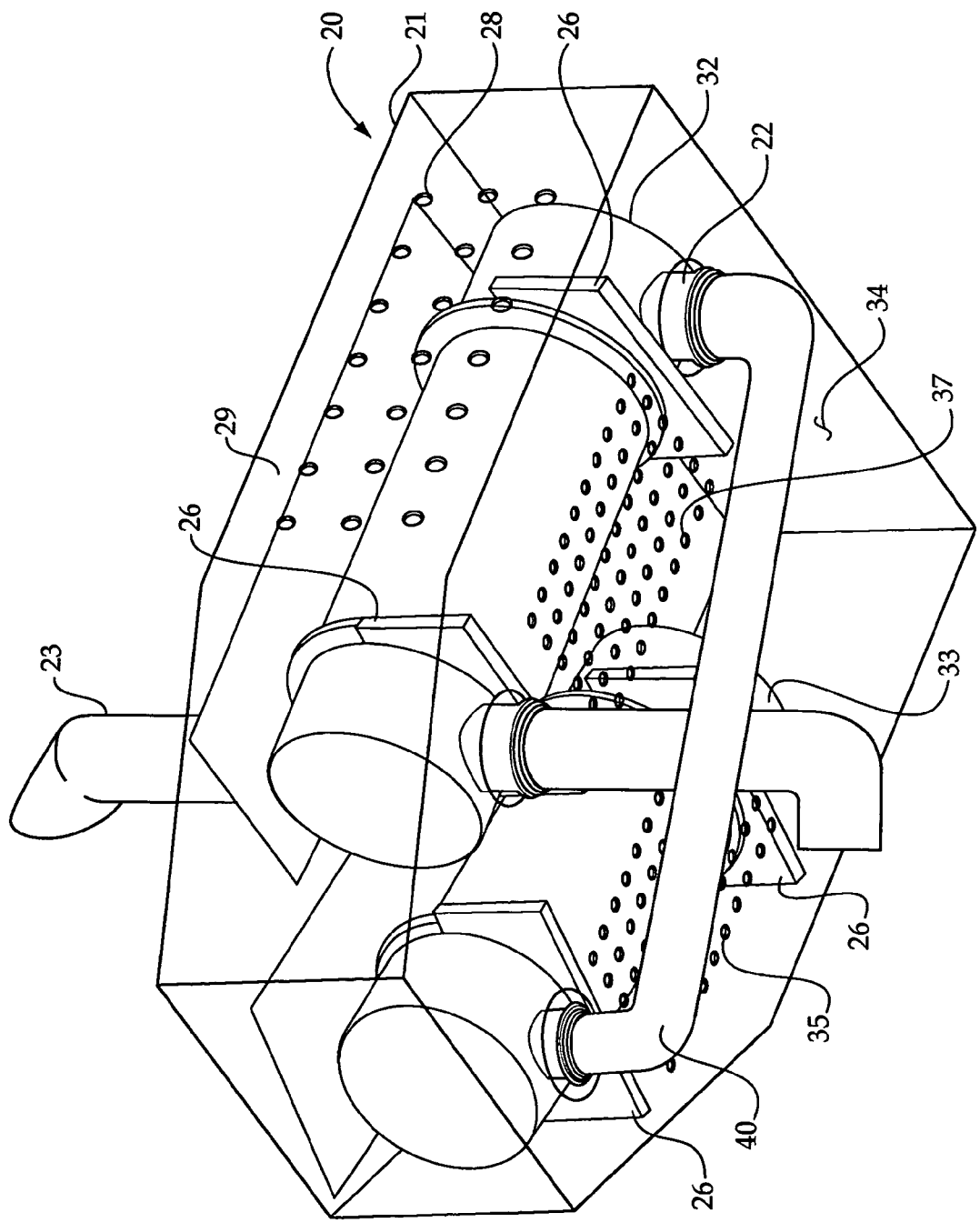
FIG. 4 is a bottom perspective view of the engine hood assembly shown in FIGS. 1-3.

Referring now in addition to FIGS. 2-4, various features associated with hood assembly 20 are illustrated. As stated earlier, hood assembly 20 includes an enclosure 21 that may be manufactured in any suitable manner such as via sheet metal and/or steel plates joined in any suitable manner, such as welding and/or fasteners. The enclosure 21 of engine hood assembly 20 defines an interior 24 within which at least one exhaust aftertreatment device is mounted. In this specific example, a particulate filter can 33 is fluidly connected in series to a NOx reducer can 32 prior to the exhaust exiting via exhaust stack 23. Particulate filter 33 may have any conventional design and may or may not include a catalytic coating therein of a type well known in the art. In addition, the NOx reducer can take any suitable structure known in the art. In addition, the present disclosure contemplates any exhaust aftertreatment device, particularly those associated with the reduction of undesirable chemical exhaust emissions. Thus, as used in this disclosure, an aftertreatment device is something other than a muffler, which is used to suppress noise emissions from an engine. In the illustrated embodiment, particulate filter can 33 and NOx reducer can 32 are mounted on cradles 26 in a conventional manner, such as via metallic straps. The cradles 26 may be attached to the interior surface of enclosure 21 in any suitable manner, such a via welding or by using appropriate fasteners. Enclosure 21 may include access panels 25 and 27 on the top that can facilitate servicing and replacement of exhaust aftertreatment devices mounted in the interior of the hood assembly 20. Those skilled in the art will appreciate that any means, such as doors or relocated panels, are contemplated for providing access to the cans 32, 33.

Particulate filter 33 and NOx reducer 32 may be fluidly joined in any suitable manner, such as via a conduit 40 that is located outside of enclosure 21 as best shown in FIG. 4. Those skilled in the art will appreciate the conduit 40 may allow for a sufficient separation between particulate filter 33 and NOx reducer 32 to better facilitate optimal functioning of both aftertreatment devices. An inlet exhaust passage to the particulate filter 33 extends through the bottom of enclosure 21 and comprises an exhaust passage 22 that is connected to an exhaust pipe 17 from engine 16 at a connection 18. Thus, exhaust from engine 16 travels through exhaust pipe 17, through exhaust passage 22 is filtered in particulate filter can 33 and then flows to NOx reducer can 32 via conduit 40. After passing through NOx reducer 32, the treated exhaust is vented to atmosphere via exhaust stack 23 in a conventional manner.

Hood assembly 20 may include features that assist in passively and/or actively creating air flow through interior 24 to cool the exhaust aftertreatment devices 32, 33. In addition, because hood assembly 20 is located above engine 16, it may further include features that assist in circulating air around engine 16 and removing heat from the same. In particular, enclosure 21 may include an array ventilation openings 28 on only one or opposite sides 29 in order to allow for the inflow and outflow of air from the environment into and out of interior 24. In addition, exhaust stack 23 may be equipped with a suction venturi 30 that acts to continuously remove air from interior 24 and vent the same through exhaust stack 23 in a known manner when engine 16 is running. This aspect of the disclosure can be further leveraged by including ventilation openings 35 and 37 in the bottom 34 of enclosure 21. These ventilation openings may be located directly under their respective exhaust aftertreatment devices 32 and 33, and may provide for direct fluid communication between interior 24 and the engine compartment. Thus, when engine 16 is operated, the suction venturi 30 will continuously remove air, and hence heat, from interior 24. This action will facilitate removal of heated air from around engine 16 and will permit fresh air to circulate into enclosure 21 via ventilation openings 28. In the specific embodiment described, air would flow from the engine compartment into interior 24 via ventilation opening 35 and 37, and fresh air also would flow into the interior 24 via openings 28, absorb heat, and then pass back to atmosphere via suction venturi 30 and exhaust stack 23.

The engine hood assembly 30 may be mated to machine 10 in any suitable manner, such as similar to previous hood attachment strategies. However, one possible alternative would be to include mounting pads on the bottom 34 of enclosure 21 for attachment to support beams 19 that would be connected at their opposite ends to frame 12 in any suitable manner. For instance, the support beams 19 could be added to frame 12 in a manner similar to engine mounts to facilitate connection to frame 12 and provide the necessary structural support for hood assembly 20. This strategy may be desirable in instances when the hood assembly is relatively heavy compared to previous hoods.

INDUSTRIAL APPLICABILITY

The present disclosure finds potential application in any off-highway machine in need of exhaust aftertreatment devices to meet ever more stringent emissions regulations in various jurisdictions. In addition, the present disclosure facilitates this modification without extensive and potential costly redesign of the entire machine, while maintaining and facilitating passive air flow and heat rejection strategies of previous systems. The concept of this disclosure can be further leveraged by preassembling the hood assembly so that a one-pass installation onto the machine during its assembly can be facilitated. Hood assembly can be mounted similar to strategy used for the previous hood, such as via a rear hood support and radiator guard, or may include new mounting features such as the support beams 19 shown in FIGS. 2 and 3.

As machine 10 is being built, it may move along an assembly line. At a suitable location, a hood assembly according to the present disclosure is lowered onto the machine. The exhaust aftertreatment system housed in the enclosure 21 of the hood assembly may then be fluidly connected to an exhaust pipe 17 from the engine 16 of the machine 10. The hood assembly 20 is then connected to the frame 12 of the machine in any suitable manner, such as via fasteners attached to support beams 19 as illustrated in FIGS. 2 and 3.

As stated, the hood assembly is preferably preassembled prior to being connected to machine 10. The preassembly process would include forming an enclosure 21 that includes ventilation openings, 28, 35 and 37. At least one exhaust aftertreatment device 32, 33 is then mounted in the interior 24 of the enclosure 21. An exhaust passage 22 extends through a bottom 34 of the enclosure for mating to an exhaust pipe 17 from the engine at a connection 18. A fluid connection between the exhaust aftertreatment devices is facilitated by a conduit 40 that may be positioned at any suitable location. In the illustrated embodiment, conduit 40 is located outside of enclosure 21, and includes a sufficient length to facilitate optimum operation of the aftertreatment devices, 32, 33. An exhaust stack 23 is attached to extend through a top of the enclosure 21 and is connected to one of the exhaust aftertreatment devices 32, 33 mounted in the interior 24 of the enclosure 21. Air circulation may be better facilitated by including a suction venturi that opens to the interior 24 and exhaust stack 23. Heat may be removed from an engine compartment by including ventilation openings 35 and 37 between the interior 24 of enclosure 21 and the engine compartment.

The solution described above integrates diesel particulate and NOx reduction aftertreatment devices, and their associated components, if any, into the hood of a track-type tractor machine 10 or other off-highway equipment. In addition, this is done in a way that completely encloses the aftertreatment devices in their own enclosure 21. Installation and servicing of the aftertreatment devices 32, 33 can be facilitated via access panels 25 and 27 that are included as part of enclosure 21. This structure can allow for shorter and easier assembly and servicing of various components, including the aftertreatment features of machine 10. In addition, the strategy disclosed allows for the incorporation of aftertreatment devices without undermining air flow and heat rejection strategies associated with the engine 16 of the machine.

It should be understood that the above description is intended for illustrative purposes only, and is not intended to limit the scope of the present invention in any way. Thus, those skilled in the art will appreciate that other aspects of the invention can be obtained from a study of the drawings, the disclosure and the appended claims.

What is claimed is:

1. A machine comprising:
   a frame;
   a propulsion system, which includes an engine, attached to the frame;
   an engine hood having an enclosure directly attached to the engine hood and being positioned over the engine, and the engine being outside of the enclosure;
   at least one exhaust aftertreatment device configured to reduce undesirable chemical exhaust emissions that is mounted in the enclosure and fluidly connected to an exhaust pipe from the engine through an engine exhaust passage in a bottom of the enclosure; and an exhaust stack fluidly connected to the aftertreatment device and extending through the enclosure.

2. The machine of claim 1 wherein the enclosure defines a plurality of ventilation openings therethrough to allow air to circulate around the aftertreatment device; and the exhaust stack including a suction venturi with at least one opening into an interior of the enclosure to draw air that circulates around the aftertreatment device into the exhaust stack.

3. The machine of claim 2 wherein at least a portion of the ventilation openings extend between an engine compartment and the interior of the enclosure to draw air from the engine enclosure into the interior of the enclosure via the suction venturi.

4. The machine of claim 3 wherein the engine hood is mounted atop a plurality of support beams that are attached to the frame and extend upward adjacent the engine.

5. The machine of claim 4 wherein the propulsion system includes a pair of tracks; and the at least one aftertreatment device includes a particulate filter in a first can fluidly connected in series with a NOx reducer in a second can; and the first and second cans are supported in at least one cradles attached to an interior surface of the enclosure.

6. The machine of claim 5 wherein the enclosure includes removable access panels over the first and second cans respectively.

7. The machine of claim 6 wherein the first and second cans are fluidly connected via a conduit partially located outside of the enclosure.

8. The machine of claim 1 wherein the at least one aftertreatment device includes a particulate filter in a first can connected in series with a NOx reducer in a second can.

9. The machine of claim 8 wherein the first and second cans are supported on at least one cradle attached to an interior surface of the engine hood enclosure.

10. The machine of claim 9 wherein the engine hood enclosure includes removable access panels over the first and second cans respectively.

11. The machine of claim 10 wherein the first and second cans are fluidly connected via a conduit partially located outside of the engine hood enclosure.

12. A machine comprising:

a frame;

a propulsion system, which includes an engine, attached to the frame;

an engine hood positioned over the engine, and including an enclosure;

at least one exhaust aftertreatment device configured to reduce undesirable chemical exhaust emissions that is mounted in the enclosure and fluidly connected to an exhaust pipe from the engine through an opening in a bottom of the enclosure;

an exhaust stack fluidly connected to the aftertreatment device and extending through the enclosure;

the enclosure defines a plurality of ventilation openings therethrough to allow air to circulate around the aftertreatment device;

the exhaust stack including a suction venturi with at least one opening into an interior of the enclosure to draw air that circulates around the aftertreatment device into the exhaust stack;

at least a portion of the ventilation openings extend between an engine compartment and the interior of the enclosure to draw air from the engine enclosure into the interior of the enclosure via the suction venturi;

the engine hood is mounted atop a plurality of support beams that are attached to the frame and extend upward adjacent the engine;

the propulsion system includes a pair of tracks;

the at least one aftertreatment device includes a particulate filter in a first can fluidly connected in series with a NOx reducer in a second can; and the first and second cans are supported in at least one cradle attached to an interior surface of the enclosure.

* * * * *